US009367472B2

United States Patent
Bridge, Jr. et al.

(10) Patent No.: US 9,367,472 B2
(45) Date of Patent: Jun. 14, 2016

(54) OBSERVATION OF DATA IN PERSISTENT MEMORY

(71) Applicant: Oracle International Corporation, Redwood Shores, CA (US)

(72) Inventors: William H. Bridge, Jr., Alameda, CA (US); Paul Loewenstein, Palo Alto, CA (US); Mark A. Luttrell, Cedar Park, TX (US)

(73) Assignee: Oracle International Corporation, Redwood Shores, CA (US)

( * ) Notice: Subject to any disclaimer, the term of this patent is extended or adjusted under 35 U.S.C. 154(b) by 377 days.

(21) Appl. No.: 13/914,001

(22) Filed: Jun. 10, 2013

(65) Prior Publication Data

US 2014/0365734 A1   Dec. 11, 2014

(51) Int. Cl.
*G06F 12/08* (2006.01)
*G06F 9/52* (2006.01)

(52) U.S. Cl.
CPC .............. *G06F 12/0891* (2013.01); *G06F 9/52* (2013.01); *G06F 12/0804* (2013.01); *G06F 12/084* (2013.01); *G06F 12/0815* (2013.01); *G06F 12/0831* (2013.01); *G06F 12/0833* (2013.01); *G06F 12/0868* (2013.01)

(58) Field of Classification Search
CPC ............ G06F 12/0804; G06F 12/0815; G06F 12/0831; G06F 12/0833; G06F 12/084; G06F 12/0868; G06F 12/0891; G06F 9/52
USPC ......... 711/118, 141, 143, 144, 145, 150, 151, 711/152, 163
See application file for complete search history.

(56) References Cited

U.S. PATENT DOCUMENTS

| 5,619,665 | A  | 4/1997  | Emma |
| 6,154,849 | A  | 11/2000 | Xia |
| 6,334,177 | B1 | 12/2001 | Baumgartner et al. |
| 6,493,800 | B1 | 12/2002 | Blumrich |
| 6,535,905 | B1 | 3/2003  | Kalafatis et al. |
| 6,549,930 | B1 | 4/2003  | Chrysos et al. |
| 6,618,742 | B1 | 9/2003  | Krum |
| 6,785,803 | B1 | 8/2004  | Merchant et al. |

(Continued)

OTHER PUBLICATIONS

International Search Report and Written Opinion in International Application No. PCT/US2014/041632, mailed Sep. 23, 2014, 8 pages.

(Continued)

*Primary Examiner* — Arpan P. Savla
(74) *Attorney, Agent, or Firm* — Rory D. Rankin; Meyertons, Hood, Kivlin, Kowert & Goetzel, P.C.

(57) ABSTRACT

Systems and methods for reliably using data storage media. Multiple processors are configured to access a persistent memory. For a given data block corresponding to a write access request from a first processor to the persistent memory, a cache controller prevents any read access of a copy of the given data block in an associated cache. The cache controller prevents any read access while detecting an acknowledgment that the given data block is stored in the persistent memory is not yet received. Until the acknowledgment is received, the cache controller allows write access of the copy of the given data block in the associated cache only for a thread in the first processor that originally sent the write access request. The cache controller invalidates any copy of the given data block in any cache levels below the associated cache.

19 Claims, 8 Drawing Sheets

(56) References Cited

U.S. PATENT DOCUMENTS

| | | | |
|---|---|---|---|
| 6,898,687 | B2 | 5/2005 | Wu et al. |
| 7,000,047 | B2 | 2/2006 | Nguyen et al. |
| 7,076,609 | B2 | 7/2006 | Garg et al. |
| 7,330,988 | B2 | 2/2008 | Golla et al. |
| 7,353,517 | B2 | 4/2008 | Accapadi et al. |
| 7,360,218 | B2 | 4/2008 | Accapadi et al. |
| 7,458,077 | B2 | 11/2008 | Duke |
| 7,475,399 | B2 | 1/2009 | Arimilli et al. |
| 7,590,803 | B2 | 9/2009 | Wintergerst |
| 7,707,578 | B1 | 4/2010 | Zedlewski et al. |
| 8,037,250 | B1 | 10/2011 | Barreh et al. |
| 8,069,444 | B2 | 11/2011 | Fedorova |
| 9,158,689 | B2 | 10/2015 | Solihin |
| 2002/0091914 | A1 | 7/2002 | Merchant et al. |
| 2004/0088495 | A1 | 5/2004 | Glasco et al. |
| 2004/0226011 | A1 | 11/2004 | Augsburg et al. |
| 2004/0243457 | A1 | 12/2004 | D'Andrea et al. |
| 2005/0044319 | A1 | 2/2005 | Olukotun |
| 2005/0132375 | A1 | 6/2005 | Douceur et al. |
| 2006/0036810 | A1 | 2/2006 | Accapadi et al. |
| 2006/0090163 | A1 | 4/2006 | Karisson et al. |
| 2006/0143390 | A1 | 6/2006 | Kottapalli |
| 2006/0184741 | A1 | 8/2006 | Hrusecky et al. |
| 2006/0212853 | A1 | 9/2006 | Sutardja |
| 2006/0271937 | A1 | 11/2006 | Hack |
| 2007/0079072 | A1 | 4/2007 | Collier et al. |
| 2007/0079074 | A1 | 4/2007 | Collier et al. |
| 2007/0118726 | A1 | 5/2007 | Abernathy et al. |
| 2007/0130568 | A1 | 6/2007 | Jung et al. |
| 2007/0282838 | A1* | 12/2007 | Shavit .................. G06F 9/3004 |
| 2007/0282928 | A1 | 12/2007 | Jiao et al. |
| 2007/0300231 | A1 | 12/2007 | Aguilar et al. |
| 2008/0114972 | A1 | 5/2008 | Codrescu et al. |
| 2008/0201563 | A1 | 8/2008 | Dale et al. |
| 2008/0250233 | A1 | 10/2008 | Marden et al. |
| 2009/0271592 | A1 | 10/2009 | Jensen |
| 2010/0023695 | A1 | 1/2010 | Guthrie et al. |
| 2010/0115244 | A1 | 5/2010 | Jensen et al. |
| 2010/0293420 | A1* | 11/2010 | Kapil .................. G06F 12/08 714/710 |
| 2011/0029978 | A1 | 2/2011 | Smolens et al. |
| 2011/0078697 | A1 | 3/2011 | Smittle et al. |
| 2011/0307653 | A1* | 12/2011 | Rudelic ............... G06F 12/0831 711/105 |
| 2011/0307665 | A1* | 12/2011 | Rudelic ................ G06F 12/084 711/130 |
| 2013/0086330 | A1 | 4/2013 | Baddepudi et al. |
| 2013/0290675 | A1 | 10/2013 | Chou et al. |

OTHER PUBLICATIONS

Wicki et al., U.S. Appl. No. 14/834,628, entitled "Reducing Cache Coherency Directory Bandwidth by Aggregating Victimization Requests", filed Aug. 25, 2015, 34 pages.

Akkary et al., "A Dynamic Multithreading Processor", MICRO 31 Proceedings of the 31st Annual ACM/IEEE International Symposium on Microarchitecture, Nov. 1, 1998, pp. 226-236, IEEE Computer Society Press, Los Alamitos, CA, USA.

Tullsen et al., "Exploiting Choice: Instruction Fetch and Issue on an Implementable Simultaneous Multithreading Processor", ISCA '96 Proceedings of the 23rd Annual International Symposium on Computer Architecture, May 1996, pp. 191-202, vol. 24, Issue 2, ACM, New York, NY, USA.

Spracklen et al., "Chip Multithreading: Opportunities and Challenges", HPCA '05 Proceedings of the 11th International Symposium on High-Performance Computer Architecture, Feb. 12, 2005, pp. 248-252, IEEE Computer Society, Washington, DC, USA.

Fedorova et al., "Cache-Fair Thread Scheduling for Multicore Processors", Technical Report TR-17-06, Division of Engineering and Applied Sciences, Harvard University, Oct. 2006, 12 pages.

Fedorova et al., "Performance of Multithreaded Chip Multiprocessors and Implications for Operating System Design", ATEC '05 Proceedings of the Annual Conference on USENIX Annual Technical Conference, Apr. 10, 2005, 4 pages, USENIX Association, Berkeley, CA, USA.

Kim et al., "Fair Cache Sharing and Partitioning in a Chip Multiprocessor Architecture", PACT '04 Proceedings of the 13th International Conference on Parallel Architectures and Compilation Techniques, Sep. 29, 2004, 12 pages, IEEE Computer Society, Washington, DC, USA.

Fedorova et al., "CASC: A Cache-Aware Scheduling Algorithm for Multithreaded Chip Multiprocessors", Sun Labs Technical Report TR 2005-0142, Harvard University, Apr. 2005, 15 pages.

Hily et al., "Standard Memory Hierarchy Does Not Fit Simultaneous Multithreading", In Proceedings of the Workshop on Multithreaded Execution Architecture and Compilation, Jan. 1998, 8 pages.

* cited by examiner

OBSERVATION OF DATA IN PERSISTENT MEMORY

BACKGROUND OF THE INVENTION

1. Field of the Invention

This invention relates to computing systems, and more particularly, to reliably using data storage media.

2. Description of the Relevant Art

A variety of products utilize both general-purpose processors and application-specific processors. Examples of these products include desktop computers, servers, cell phones or smart phones, tablet computers, personal digital assistant (PDA) devices, equipment and devices that may include embedded processors for medical applications, automobile applications, home theater applications, and so forth. General-purpose processors access a main memory for data and instructions during the processing of algorithms and methods comprised within software applications. Similarly, application-specific processors access a main memory. The application-specific processors may include single-instruction-multiple-data (SIMD) processors, application-specific integrated circuits (ASICs), digital signal processing chips (DSPs), and so forth.

The main memory may be accessible to one or more processors. Data may be stored in a persistent manner. When power is removed, the persistent data remains stored. When the power is restored, the persistent data may be accessed by the one or more processors and used again. However, data stored in a non-persistent manner is lost when the power is removed and unavailable when the power is restored.

The data stored in a persistent manner is stored on a non-volatile data storage medium, such as hard disk drives (HDDs), solid-state drives (SSDs), and flash memory. These types of storage media utilize large, slow data transfers, which increase access times and reduce performance. Therefore, a memory hierarchy is used to temporarily buffer data in multiple levels of volatile memory, which utilizes relatively smaller and faster data transfers than non-volatile memory. The types of volatile memory include one or more levels of caches and dynamic random access memory (DRAM).

Other types of non-volatile data storage media to use as persistent memory include phase change memory (PCM), spin torque transfer RAM, and memristors. These types of data storage media also utilize relatively smaller and faster data transfers than HDDs, SDDs and flash non-volatile memory. This type of persistent memory may be placed side-by-side with DRAM on a printed circuit board, a printed circuit card, or a silicon die. This type of persistent memory may be available to one or more processors, each processor executing one or more threads.

Store data for a first store (write) operation from a first thread to persistent memory, such as PCM, is observable by other threads. The other threads may be on the same processor and on any other processors. It is possible for a second thread on a same processor or on a different processor to read the store data, update another variable based on the store data, and force the updated variable to be persistent by sending a second store operation to persistent memory. The second store operation may complete prior to completion of the first store operation and cause the updated variable to be made persistent prior to the store data from the first thread is made persistent. Afterward, with the store data from the first thread still not persistent, a power failure or a system reset would cause data corruption since inconsistent data is stored in the persistent memory.

In view of the above, methods and mechanisms for reliably using data storage media are desired.

SUMMARY OF THE INVENTION

Systems and methods for reliably using data storage media are contemplated. In one embodiment, a computing system includes multiple sources for generating memory access requests. The sources may include multiple threads within a processor. Additionally, the sources may include multiple processors. The one or more processors in the system are coupled to a persistent memory. The one or more processors send read and write access requests to the persistent memory via one or more levels of caches.

For a given data block corresponding to a write access request to the persistent memory, a cache controller prevents any read access of a copy of the given data block in an associated cache. The cache controller may prevent any read access while detecting an acknowledgment that the given data block is stored in the persistent memory is not yet received. The cache controller and the associated cache may be at a selected level of a cache memory subsystem. Examples of a selected level include a cache level shared by multiple processors or a previous level to the shared cache level.

Until the acknowledgment is received, the cache controller may allow write access of the copy of the given data block in the associated cache only for a particular source. The particular source may be a thread that originally sent the write access request. The cache controller may invalidate any copy of the given data block in any cache levels below the associated cache. Additionally, the cache controller may prevent any coherence state transition for the given data block to a coherence state indicating the given data block is both dirty and is read accessible.

These and other embodiments will become apparent upon reference to the following description and accompanying drawings.

Figure 1:
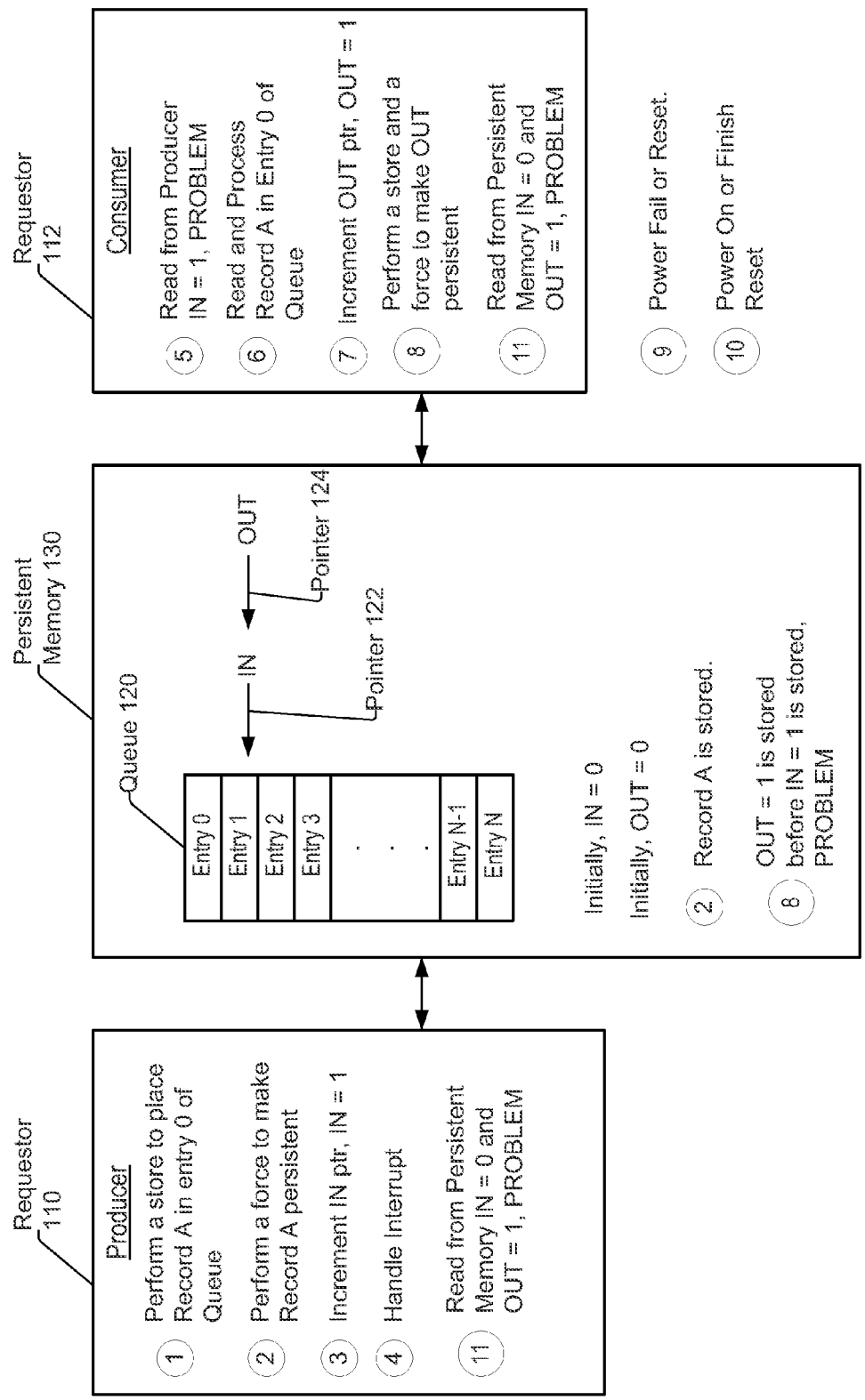
FIG. 1 is a generalized block diagram illustrating one embodiment of accesses to persistent memory.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

Referring to FIG. 1, a generalized block diagram illustrating one embodiment of accesses to persistent memory is shown. A series of sequences 1-11 is shown. Two requestors 110-112 generate read and write access requests for both local (cached) data in the other requestor and for persistent data in the persistent memory 130. Some of these access requests are sent to the persistent memory 130. When power is removed, the persistent data remains stored in the persistent memory. When the power is restored, the persistent data may be accessed by the requestors 110-112 and used again.

The requestor 110 produces or creates data corresponding to Record A to be stored in the entry 0 of the queue 120. For example, the requestor 110 may perform an arithmetic operation with the data corresponding to Record A as the result. The requestor 110 may be referred to as the producer 110. Similarly, the requestor 112 may be referred to as the consumer 112. The queue 120 may be a data structure, such as a circular buffer, used to asynchronously communicate between two different requestors, such as two different threads of execution or two different processors or two different processor cores. Each of the multiple entries 0-N in the queue 120 may store a record of data.

The pointers 122-124 may be used to indicate the beginning and the end of the circular buffer. For example, the IN pointer 122 may indicate a next available entry to use for storing a record. The OUT pointer 124 may indicate a next entry to deallocate and have a record removed. The producer 110 may store records into the queue 120 and advance the IN pointer 122 after a record is stored. The consumer 112 may fetch records from the queue 120 and advance the OUT pointer 124 after a record is processed. When the IN pointer 122 and the OUT pointer 124 store a same value, the queue 120 may be considered to be empty. Entries before an entry pointed to by the IN pointer 122 and after an entry pointed to by the OUT pointer 124 may be considered to be waiting in the queue 120.

The persistent memory 130 may be a data storage medium utilizing data storage technology such as phase change memory (PCM), spin torque transfer RAM, memristors, and so forth. These types of data storage media utilize relatively smaller and faster data transfers than hard disk drives (HDDs), solid-state drives (SSDs), and flash non-volatile memory. For example, the above examples of persistent memory are byte addressable and perform data transfers several orders of magnitude faster than HDDs and flash memory.

In some embodiments, the requestors 110-112 include multiple threads on a processor. Alternatively, the requestors 110-112 include multiple processor cores in a microprocessor. In other embodiments, the requestors 110-112 include multiple processors in a node of a multi-node system. Although two requestors are shown, any number of requestors may be used in a computing system. Each one of the requestors 110-112 in a computing system may be coupled to a respective off-die memory. The respective off-die memory may include a dynamic random access memory (DRAM), which is not shown for ease of illustration.

Through the use of coherence links, each processor is connected to one or more other processors in the computing system, and has access to on-die caches and a respective off-die memory of the one or more other processors. Whether socket or surface mount technology is used, a processor and its respective off-die memory may be referred to as a node. A processor within a given node may have access to a most recently updated copy of data in the on-die caches and off-die memory of other nodes through one or more coherence links.

Generally, a processor includes one or more general-purpose processor cores and one or more on-die caches arranged in a cache hierarchical subsystem. The general-purpose processor cores may execute instructions according to a given general-purpose instruction set. Alternatively, a processor may include heterogeneous cores, such as one or more general-purpose cores and one or more application specific cores. The application specific cores may include a graphics processing unit (GPU), a digital signal processor (DSP), one of a variety of single-instruction-multiple-data (SIMD) chips, and so forth.

The numbered sequences 1 to 11 illustrate a condition when inconsistent data may be stored in the persistent memory. For example, the requestor 110, or producer 110, produces a value scheduled to be stored as persistent data that is observed by the requestor 112, or consumer 112, prior to the value is stored as persistent data. The consumer 112 may observe or read the value, modify a copy of the value, and schedule the modified copy of the value to be stored as persistent data in persistent memory. The modified copy of the value may be stored as persistent data prior to the original value is stored as persistent data. Should a power failure occur, the persistent memory stores inconsistent data.

Similarly, the consumer 112 may read a first value produced by the producer 110, take steps according to an algorithm based on a copy of the first value, and modify a different second value. The consumer 112 may schedule the modified second value to be stored as persistent data in persistent memory 130. The modified second value may be stored as persistent data prior to the original first value is stored as persistent data. Again, should a power failure occur, the persistent memory 130 contains inconsistent data.

Before continuing with the illustrated example with sequences 1-11, an example of sharing data without persistent memory is briefly described. A store (write) request from a first processor to memory is sent to the first processor's cache. Eventually the modified cache line may get flushed from the first processor's cache to DRAM. If a second processor sends a load (read) operation for the modified cache line before the modified cache line is sent to the DRAM, then the second processor obtains the modified cache line from the first processor's cache. Therefore, the modified cache line is observed or read prior to the modified cache line is stored in the DRAM. Should a power failure occur, the modified cache line is lost as well as all content stored in the DRAM. Accordingly, inconsistent data is not retained in the DRAM when power is restored. However, with persistent memory, inconsistent data may be observed after power is restored due to the events prior to the power failure.

Returning to the sequences 1 to 11, in sequence 1, the producer 110 may execute a store (write) instruction that sends data corresponding to Record A to persistent memory 130 for storage. A cache controller, a memory controller, or both may include logic that determines a respective address space for each of DRAM and the persistent memory 130. The two address spaces may be programmed and loaded upon a startup sequence. Therefore, it is known which memory, the DRAM or the persistent memory 130, is targeted by a given store instruction. The store instruction may be sent to several hardware units before completing its operation and have Record A actually stored in the persistent memory 130. Examples of these units and the steps used to send and process the store instruction are further described in a later example.

Each thread of multiple threads may be capable of executing a synchronization instruction, such as a persistent memory barrier instruction. The persistent memory barrier instruction may force all previous store instructions to persistent memory 130 to commit data to the persistent memory 130 and perform an acknowledgment of the commit prior to any commit is allowed of instructions after the persistent memory barrier instruction. In various embodiments, a software programmer may include persistent memory barrier instructions in a computer program after updates to records in a circular buffer and prior to corresponding updates to the pointers. Similarly, the software programmer may include persistent memory barrier instructions in the computer program after updates to pointers and prior to subsequent updates to the records in the circular buffer.

In sequence 2, the producer 110 may perform a force, such as executing a persistent memory barrier instruction, to make Record A persistent. In the illustrated example, the Record A is shown stored in persistent memory 130 in sequence 2. Again, the several hardware units and steps used to make Record A persistent are later described. For ease of illustration, the units and steps are not shown or described here.

In sequence 3, the producer 110 may update a local copy of the IN pointer 122. In some embodiments, the update of the local copy of the IN pointer 122 may occur in response to receiving the acknowledgment that the Record A is stored in the persistent memory 130. In some embodiments, the update of the local copy of the IN pointer 122 may be an increment operation. For example, the local copy of the IN pointer 122 may have a value of 0 and it is incremented to a value of 1. An arithmetic operation may be used to increment the copy of the IN pointer 122 and update an architectural register in a processor. The updated (incremented) copy of the IN pointer 122 may be sent to a local cache with a store (write) instruction. However, the updated (incremented) copy of the IN pointer 122 may not yet be sent to the persistent memory 130 let alone stored in the persistent memory 130.

In sequence 4, the producer 110 may handle an interrupt. The interrupt handling may delay the processing to make the local updated copy of the IN pointer 122 persistent. The interrupt delays the process to make the local copy of the IN pointer 122 persistent. In other cases, an interrupt may not occur, but there may still be a delay in the process to make the local updated copy of the IN pointer 122 persistent. The delay may cause the local updated copy of the IN pointer 122 to not be persistent before the local updated copy of the OUT pointer 124 in the consumer 112 is made to be persistent.

In sequence 5, the consumer 112 reads the local copy or cached copy of the IN pointer 122 from the producer 110. Now, the consumer 112 has a local (cached) copy of the IN pointer 122 with a value of 1 prior to the updated IN pointer 122 being stored in the persistent memory 130. The persistent memory 130 still contains an initial value of 0 for the IN pointer 122.

In sequence 6, the consumer 112 may read the updated Record A from either the producer 110 or the persistent memory 130. The consumer 112 stores a local copy or cached copy of the Record A. The consumer 112 processes the local copy or cached copy of the Record A. In sequence 7, the consumer 112 may update a local copy of the OUT pointer 124. In some embodiments, the update of the local copy of the OUT pointer 124 may be an increment operation. For example, the local copy of the OUT pointer 124 may have a value of 0 and it is incremented to a value of 1. An arithmetic operation may be used to increment the copy of the OUT pointer 124 and update an architectural register in a processor.

In sequence 8, the consumer begins execution to make the updated local copy of the OUT pointer 124 persistent. The consumer 112 may execute a store (write) instruction that sends modified data corresponding to the OUT pointer 124 to persistent memory 130 for storage. The updated (incremented) copy of the OUT pointer 124 may be sent to a local cache due to the store (write) instruction. A cache controller, a memory controller, or both may include logic that determines from the address of the store instruction whether the modified data corresponding to the OUT pointer 124 is to be stored in DRAM or the persistent memory 130. The producer may perform a force, such as executing a persistent memory barrier instruction, to make the OUT pointer 124 persistent. In the illustrated example, the OUT pointer 124 is shown stored in persistent memory 130 in sequence 8. Again, the several hardware units and steps used to make OUT pointer 124 persistent are later described. For ease of illustration, the units and steps are not shown or described here.

An acknowledgment of the completed persistent store operation for the OUT pointer 124 may be sent to the consumer 112. Alternatively, an acknowledgment may be sent to a cache controller or a memory controller associated with the consumer 112. The updated value of the OUT pointer 124 is stored in the persistent memory 130 prior to the updated value of the IN pointer 122 is stored in the persistent memory 130. The producer 110 may still be performing the interrupt handling or some other delay may be still occurring. Accordingly, a race condition occurred and the update of the OUT pointer 124 in the persistent memory 130 completed before an update of the IN pointer 122 in the persistent memory 130. The persistent memory 130 now contains inconsistent data. The persistent memory 130 contains an initial value of 0 for the IN pointer 122 and an updated value of 1 for the OUT pointer 124. According to the stored data in the persistent memory 130, control logic may erroneously determine the queue 120 is full.

In sequence 9, a power failure, reboot, or system reset occurs. Data stored in volatile memory is lost. Again, the types of volatile memory may include one or more levels of caches and dynamic random access memory (DRAM). Data stored in non-volatile memory, such as the persistent memory 130, remains stored. In sequence 10, the power may be restored. Alternatively, the reboot or reset completes. In sequence 11, the consumer 112 reads values from the persistent memory 130 for each of the IN pointer 122 and the OUT pointer 124. Control logic for the consumer 112 may erroneously determine the queue 120 is full based on the inconsistent values contained in the persistent memory 130. Similarly, the producer 110 may read the inconsistent data contained in the persistent memory 130 and erroneously determine the queue 120 is full.

After power is restored or the system is rebooted, the queue 120 is not considered empty as it should be based on the persistent stored values for the IN pointer 122 and the OUT pointer 124. Rather, as described above, the queue 120 may be erroneously considered to be full. When the queue 120 stores fixed-size records, the queue 120 includes old records that were already processed when the system completes a reboot or the power is restored. When the queue 120 stores variable-sized records, the OUT pointer 124 may store a value that points to a middle of an old record and data may be invalid.

A similar inconsistent stored data problem may occur when the queue 120 is actually full. An updated value for the IN pointer 122 may be stored in persistent memory prior to an updated value for the OUT pointer 124 that is used to compute the updated value for the IN pointer 122. Control logic may later erroneously determine the queue 120 is empty.

Figure 2:
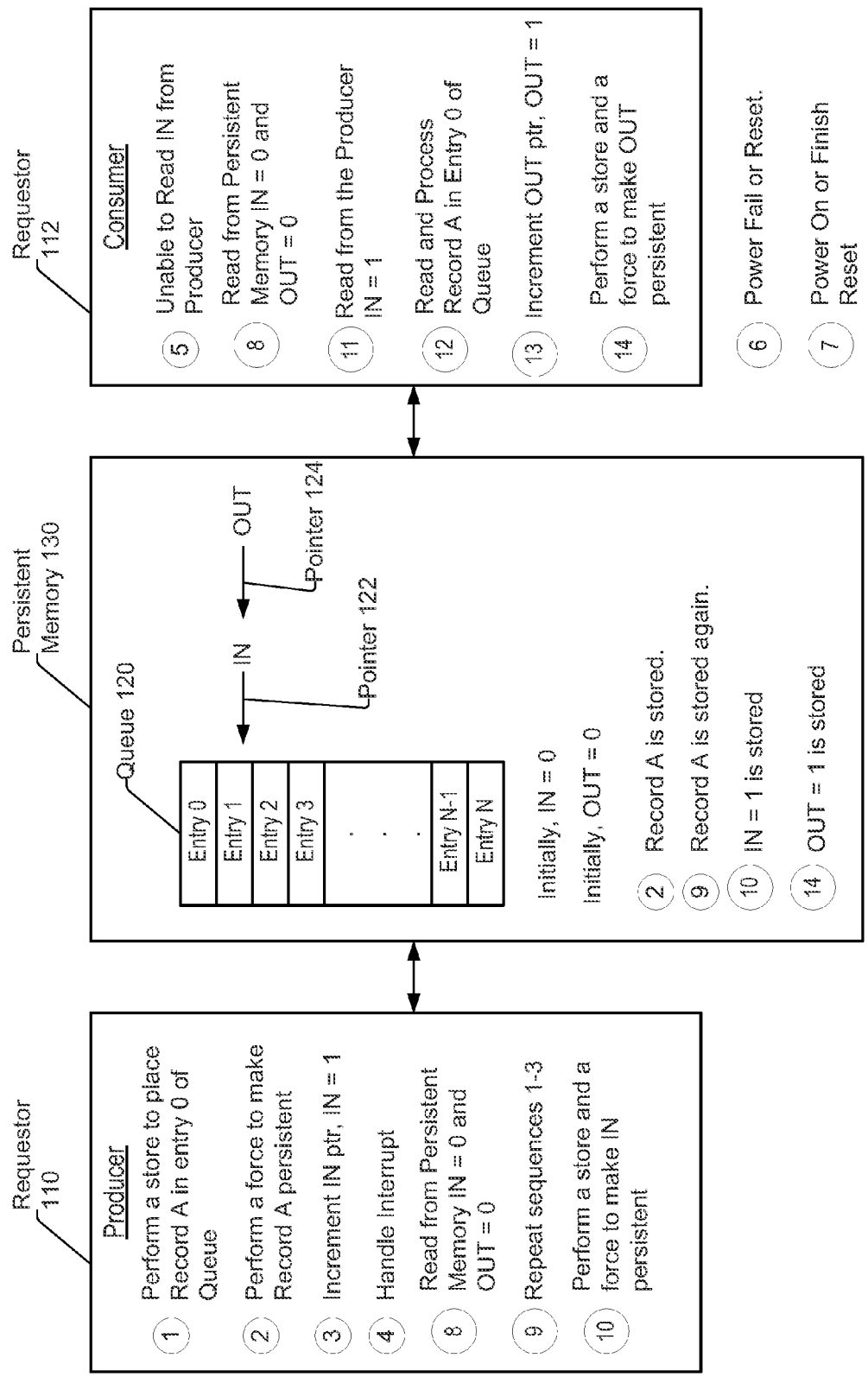
FIG. 2 is a generalized block diagram illustrating another embodiment of accesses to persistent memory.

Turning now to FIG. 2, a generalized block diagram illustrating another embodiment of accesses to persistent memory is shown. The circuitry and logic described earlier is numbered identically. A series of sequences numbered 1 to 14 is shown. The numbered sequences 1 to 14 illustrate a condition when consistent data storage is maintained in the persistent memory despite unscheduled delays in storing data in the persistent memory.

Sequences 1 to 4 are the same as described earlier for FIG. 1. However, in sequence 1, produced data for Record A may have an associated coherence state transition to a state that indicates the cache line storing the produced data is both dirty and inaccessible for read accesses. An example of such a coherence state is the Persistent Dirty (PD) state. In some embodiments, the local copy of the Record A is stored in a given cache associated with the producer 110. A corresponding cache controller may prevent any read access of the local copy of Record A in the given cache responsive to detecting the local copy has not yet been stored in the persistent memory 130. Again, the cache controller may prevent a transition to a cache coherence state indicating the local copy is both dirty and is read accessible.

The cache controller for a given cache for the producer 110 may invalidate any copy of the Record A in any cache level below the given cache. In other words, the cache controller for the given cache for the producer 110 may invalidate any copy of the Record A in any cache levels between the producer 110 and the level of the given cache. Further, in response to detecting the local copy has not yet been received by the persistent memory 130 for storage, the cache controller may allow write access of the local copy of the Record A in the given cache only for a thread in the producer 110 that originated the store instruction for Record A.

Sequences 3-4 are the same as described earlier for FIG. 1. As described earlier, in some examples, prior to the generation of the interrupt, the producer 110 may have sent a store instruction for the IN pointer 122 to the persistent memory 130. However, a subsequent persistent memory barrier instruction may not have been sent yet. In other examples, the store instruction for the IN pointer 122 to the persistent memory 130 may not yet have been sent prior to the generation of the interrupt. In either case, the interrupt delays the process to make the local copy of the IN pointer 122 persistent. In other cases an interrupt may not occur, but there may still be a delay in the process to make the local updated copy of the IN pointer 122 persistent.

Additionally, if a store instruction for the IN pointer 122 is sent to the persistent memory 130, the cache controller for a given cache may invalidate any copy of the IN pointer 122 in any cache level below the given cache. In other words, the cache controller for the given cache may invalidate any copy of the IN pointer 122 in any cache levels between the producer 110 and the level of the given cache. Additionally, a corresponding cache controller may prevent any read access of the local copy of the IN pointer 122 in the given cache responsive to detecting the local copy has not yet been stored in the persistent memory 130. The cache controller may prevent a transition to a cache coherence state indicating the local copy is both dirty and is read accessible. Rather, the cache controller may transition an associated coherence state to a state that indicates the cache line storing the IN pointer 122 is both dirty and inaccessible for read accesses. An example of such a coherence state is the Persistent Dirty (PD) state. Further, in response to detecting the local copy has not yet been sent to the persistent memory 130 for storage, the cache controller may allow write access of the local copy of the IN pointer 122 in the given cache only for a thread in the producer 110 that originated the store instruction to persistent memory 130.

In sequence 5, the consumer 112 is unable to load (read) an updated copy of the IN pointer 122 from the producer 110. The received read request from the consumer 112 may be queued in the cache controller associated with the given cache for the producer 110. The read request may remain queued in the cache controller until the cache controller receives the acknowledgment that the local copy of the IN pointer 122 is stored in the persistent memory 130.

In sequence 6, a power failure, reboot, or system reset occurs prior to the IN pointer is made persistent in the persistent memory 130. Data stored in volatile memory is lost. Data stored in non-volatile memory, such as the persistent memory 130, remains stored. In sequence 7, the power may be restored. Alternatively, the reboot or reset completes. Since read access for the updated local copy of the IN pointer 122 in the producer 110 was blocked earlier, the persistent memory 130 still stores consistent data.

In sequence 8, the consumer 112 reads values from the persistent memory 130 for each of the IN pointer 122 and the OUT pointer 124. The read values include the initial values for the IN pointer 122 and the OUT pointer 124. Similarly, the producer 110 reads the stored initial values from the persistent memory 130 for each of the IN pointer 122 and the OUT pointer 124.

Each of the producer 110 and the consumer 112 may re-execute instructions corresponding to a location in program code associated with the initial values for the IN pointer 122 and the OUT pointer 124. For example, in sequence 9, the producer 110 may re-execute code that includes updating and storing Record A in entry 0 of the queue 120 as performed earlier.

Again, produced data for Record A may have an associated coherence state transition to a state that indicates the cache line storing the produced data is both dirty and inaccessible for read accesses until an acknowledgment is received that Record A is stored in the persistent memory 130. An example of such a coherence state is the Persistent Dirty (PD) state. In sequence 9, the Record A may be stored in the persistent memory 130. An acknowledgment of the completed persistent store operation may be sent to the producer 110. Alternatively, an acknowledgment may be sent to a cache controller or a memory controller associated with the producer 110. The producer 110 may again update a local copy of the IN pointer 122 as performed earlier. For example, the local copy of the IN pointer 122 may have a value of 0 and it is incremented to a value of 1.

In sequence 10, the producer 110 begins execution to make the local updated copy of the IN pointer 122 persistent. For example, the producer 110 may execute a store instruction to persistent memory. Modified data for the IN pointer 122 may have an associated coherence state transition to a state that indicates the cache line storing the modified data is both dirty and inaccessible for read accesses. An example of such a coherence state is the Persistent Dirty (PD) state.

Continuing with sequence 10, the producer may also perform a force, such as executing a persistent memory barrier instruction, to make Record A persistent. In the illustrated example, the Record A is shown stored in persistent memory 130 in the same sequence 10 rather than a subsequent sequence. Again, the several hardware units and steps used to make Record A persistent are later described. For ease of illustration, the units and steps are not shown or described here. An acknowledgment of the completed persistent storage may be sent to the producer 110. Alternatively, an acknowledgment may be sent to a cache controller or a memory controller associated with the producer 110. The received acknowledgment may cause the cache controller to again allow read and write access of the local copy of the IN pointer 122 in the given cache associated with the producer 110. For example, the cache controller may transition a corresponding cache coherence state for the cache line holding the local copy of the IN pointer 122 to an Exclusive (E) clean state.

In sequence 11, the consumer 112 reads the local copy of the IN pointer 122 from the producer 110. Now, the consumer 112 has a local copy of the IN pointer 122 with a value of 1, which is the same value of the IN pointer stored in the persistent memory 130. In sequence 12, the consumer 112 reads and processes a copy of the Record A. In sequence 13, the consumer 112 may update a local copy of the OUT pointer 124. For example, the local copy of the OUT pointer 124 may have a value of 0 and it is incremented to a value of 1.

In sequence 14, the consumer begins execution to make the updated local copy of the OUT pointer 124 persistent. For example, the consumer 112 may execute a persistent store instruction to persistent memory 130. In some embodiments, the local copy of the OUT pointer 124 is stored in a given cache associated with the consumer 124. A corresponding cache controller may prevent any read access of the local copy in the given cache responsive to detecting an acknowledgment that the local copy is stored in the persistent memory 130 is not yet received. The cache controller may prevent a transition to a cache coherence state indicating the local copy is both dirty and is read accessible.

Additionally, the cache controller may invalidate any copy of the OUT pointer 124 in any cache level below the given cache. In other words, the cache controller for the given cache may invalidate any copy of the OUT pointer 124 in any cache levels between the consumer 112 and the level of the given cache. Further, in response to detecting the local copy has not yet been sent to the persistent memory 130 for storage, the cache controller may allow write access of the local copy of the OUT pointer 124 in the given cache only for a thread in the consumer 124 that originated the instruction to persistent memory.

The consumer 112 may also perform a force, such as executing a persistent memory barrier instruction, to make the OUT pointer 124 persistent. In the illustrated example, the OUT pointer 124 is shown stored in persistent memory 130 in sequence 14. Again, the several hardware units and steps used to make the OUT pointer 124 persistent are later described. For ease of illustration, the units and steps are not shown or described here. An acknowledgment of the completed persistent storage may be sent to the consumer 112. Alternatively, an acknowledgment may be sent to a cache controller or a memory controller associated with the consumer 112. The received acknowledgment may cause the cache controller to again allow read and write access of the local copy of the OUT pointer 124 in the given cache associated with the consumer 112. For example, the cache controller may transition a corresponding cache coherence state for the cache line holding the local copy of the OUT pointer 124 to an Exclusive (E) state.

Figure 3:
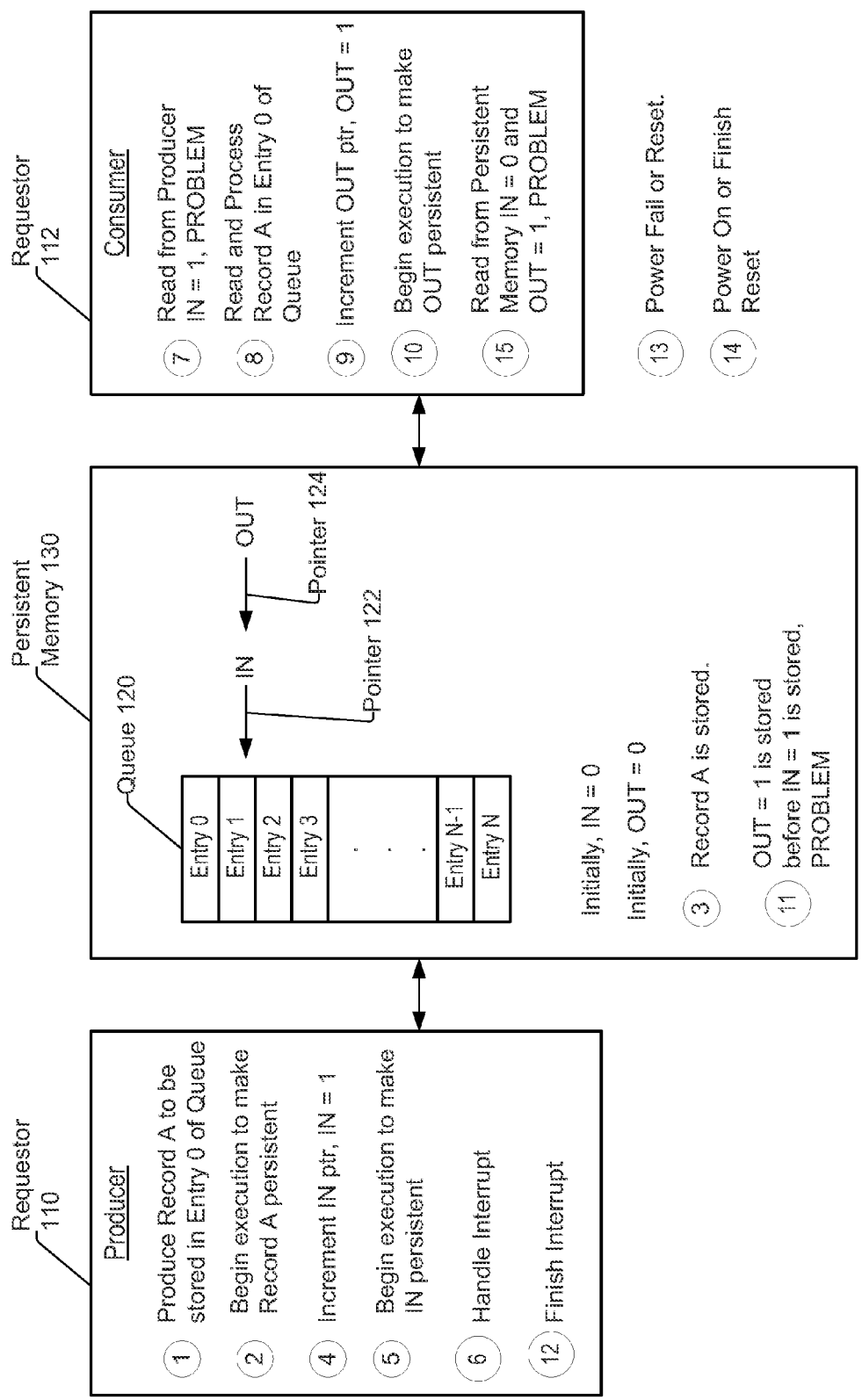
FIG. 3 is a generalized block diagram illustrating yet another embodiment of accesses to persistent memory.

Turning now to FIG. 3, a generalized block diagram illustrating yet another embodiment of accesses to persistent memory is shown. The circuitry and logic described earlier is numbered identically. A series of sequences numbered 1 to 15 is shown. In this example, the effect of intermediate hardware units and steps for processing memory access requests is included in the sequences 1-15.

In sequence 1, the requestor 110 produces or creates data corresponding to Record A to be stored in the entry 0 of the queue 120. For example, the requestor 110 may perform an arithmetic operation with the data corresponding to Record A as the result. In sequence 2, the producer 110 begins execution to make Record A persistent. For example, the producer 110 may execute a store (write) instruction that sends data corresponding to Record A to persistent memory 130 for storage. A cache controller, a memory controller, or both may include logic that determines a respective address space for each of DRAM and the persistent memory 130. The two address spaces may be programmed and loaded upon a startup sequence. Therefore, it is known which memory, the DRAM or the persistent memory 130, is targeted by a given store instruction.

The store instruction for Record A may be sent to a load-store unit (LSU) within the processor and stored. Later, the store instruction may be sent to a cache controller of a given level of caches or a memory controller and stored. The store instruction for Record A may eventually be sent to the persistent memory 130. When the updated data for Record A is stored in the persistent memory 130, an acknowledgment from the permanent memory 130 may be returned to the cache controller or the memory controller and sent again to the processor. Therefore, there may be multiple steps and queuing and processing from the time the processor begins to make particular data persistent and the data actually becomes persistent.

In addition, each thread of multiple threads may be capable of executing a synchronization instruction, such as a persistent memory barrier instruction. As previously described, the persistent memory barrier instruction may force all previous store instructions to persistent memory 130 to commit data to the persistent memory 130 and perform an acknowledgment of the commit prior to any commit is allowed of instructions after the persistent memory barrier instruction. In some embodiments, a persistent memory barrier instruction may follow the store instruction to persistent memory 130 for Record A. In other embodiments, a persistent memory barrier instruction may be used later in the computer program or not used at all.

In sequence 3, the Record A may be stored in the persistent memory 130. An acknowledgment of the completed persistent store operation may be sent to the producer 110. Alternatively, an acknowledgment may be sent to a cache controller or a memory controller associated with the producer 110. In sequence 4, the producer 110 may update a local copy of the IN pointer 122. In some embodiments, the update of the local copy of the IN pointer 122 may occur in response to receiving the acknowledgment that the Record A is stored in the persistent memory 130. In some embodiments, the update of the local copy of the IN pointer 122 may be an increment operation. For example, the local copy of the IN pointer 122 may have a value of 0 and it is incremented to a value of 1. An arithmetic operation may be used to increment the copy of the IN pointer 122 and update an architectural register in a processor. The updated (incremented) copy of the IN pointer 122 may be sent to a local cache with a store (write) instruction.

In sequence 5, the producer 110 begins execution to make the updated copy of the IN pointer 122 persistent. In some examples, the producer 110 may execute a store (write) instruction that sends modified data corresponding to the IN pointer 122 to persistent memory 130 for storage. A cache controller, a memory controller, or both may include logic that determines from the address of the store instruction whether the modified data corresponding to the IN pointer 122 is to be stored in DRAM or the persistent memory 130. In some embodiments, no persistent memory barrier instruction is sent at this time according to code in a computer program. In other embodiments, the computer program includes a persistent memory barrier instruction, but an interrupt or other delay occurs before the persistent memory barrier instruction is processed.

In sequence 6, the producer 110 may handle an interrupt. The interrupt handling may delay processing to make the local updated copy of the IN pointer 122 persistent. A persistent memory barrier instruction may not have been sent yet. The interrupt delays the process to make the local copy of the IN pointer 122 persistent. In other cases, an interrupt may not occur, but there may still be a delay in the process to make the local updated copy of the IN pointer 122 persistent.

In sequence 7, the consumer 112 reads the local copy or cached copy of the IN pointer 122 from the producer 110. Now, the consumer 112 has a local copy of the IN pointer 122 with a value of 1 prior to the updated IN pointer 122 being stored in the persistent memory 130. The persistent memory 130 still stores an initial value of 0 for the IN pointer 122.

In sequence 8, the consumer 112 may read the updated Record A from either the producer 110 or the persistent memory 130. The consumer 112 stores a local copy or cached copy of the updated Record A. The consumer 112 processes the local copy or cached copy of the Record A. In sequence 9, the consumer 112 may update a local copy of the OUT pointer 124. In some embodiments, the update of the local copy of the OUT pointer 124 may be an increment operation.

In sequence 10, the consumer begins execution to make the updated local copy of the OUT pointer 124 persistent. For example, the consumer 112 may execute a store (write) instruction that sends modified data corresponding to the OUT pointer 124 to persistent memory 130 for storage. A cache controller, a memory controller, or both may include logic that determines from the address of the store instruction whether the modified data corresponding to the OUT pointer 124 is to be stored in DRAM or the persistent memory 130. In some embodiments, no persistent memory barrier instruction is sent at this time according to code in a computer program. In other embodiments, the computer program includes a persistent memory barrier instruction and this instruction may be processed shortly after the store (write) instruction for the OUT pointer 124.

In sequence 11, the updated OUT pointer 124 may be stored in the persistent memory 130. An acknowledgment of the completed persistent store operation may be sent to the consumer 112. Alternatively, an acknowledgment may be sent to a cache controller or a memory controller associated with the consumer 112. The updated value of the OUT pointer 124 is stored in the persistent memory 130 prior to the updated value of the IN pointer 122 is stored in the persistent memory 130. The producer 110 may still be performing the interrupt handling or some other delay may be still occurring. Accordingly, a race condition occurred and the update of the OUT pointer 124 in the persistent memory 130 completed before an update of the IN pointer 122 in the persistent memory 130. The persistent memory 130 now contains inconsistent data.

In sequence 12, in some examples, the producer 110 may complete the interrupt handling. In other examples, the producer 110 may not yet complete interrupt handling. In sequence 13, a power failure, reboot, or system reset occurs. Data stored in volatile memory is lost. Again, the types of volatile memory may include one or more levels of caches and dynamic random access memory (DRAM). Data stored in non-volatile memory, such as the persistent memory 130, remains stored. In sequence 14, the power may be restored. Alternatively, the reboot or reset completes. In sequence 15, the consumer 112 reads values from the persistent memory 130 for each of the IN pointer 122 and the OUT pointer 124. Control logic for the consumer 112 may erroneously determine the queue 120 is full based on the inconsistent values stored in the persistent memory 130. Similarly, the producer 110 may read the inconsistent data stored in the persistent memory 130 and erroneously determine the queue 120 is full.

After power is restored or the system is rebooted, the queue 120 is not considered empty as it should be based on the persistent stored values for the IN pointer 122 and the OUT pointer 124. Rather, as described above, the queue 120 may be erroneously considered to be full. When the queue 120 stores fixed-size records, the queue 120 includes old records that were already processed when the system completes a reboot or the power is restored. When the queue 120 stores variable-sized records, the OUT pointer 124 may store a value that points to a middle of an old record and data may be invalid.

A similar inconsistent stored data problem may occur when the queue 120 is actually full. An updated value for the IN pointer 122 may be stored in persistent memory prior to an updated value for the OUT pointer 124 that is used to compute the updated value for the IN pointer 122. Control logic may later erroneously determine the queue 120 is empty.

Figure 4:
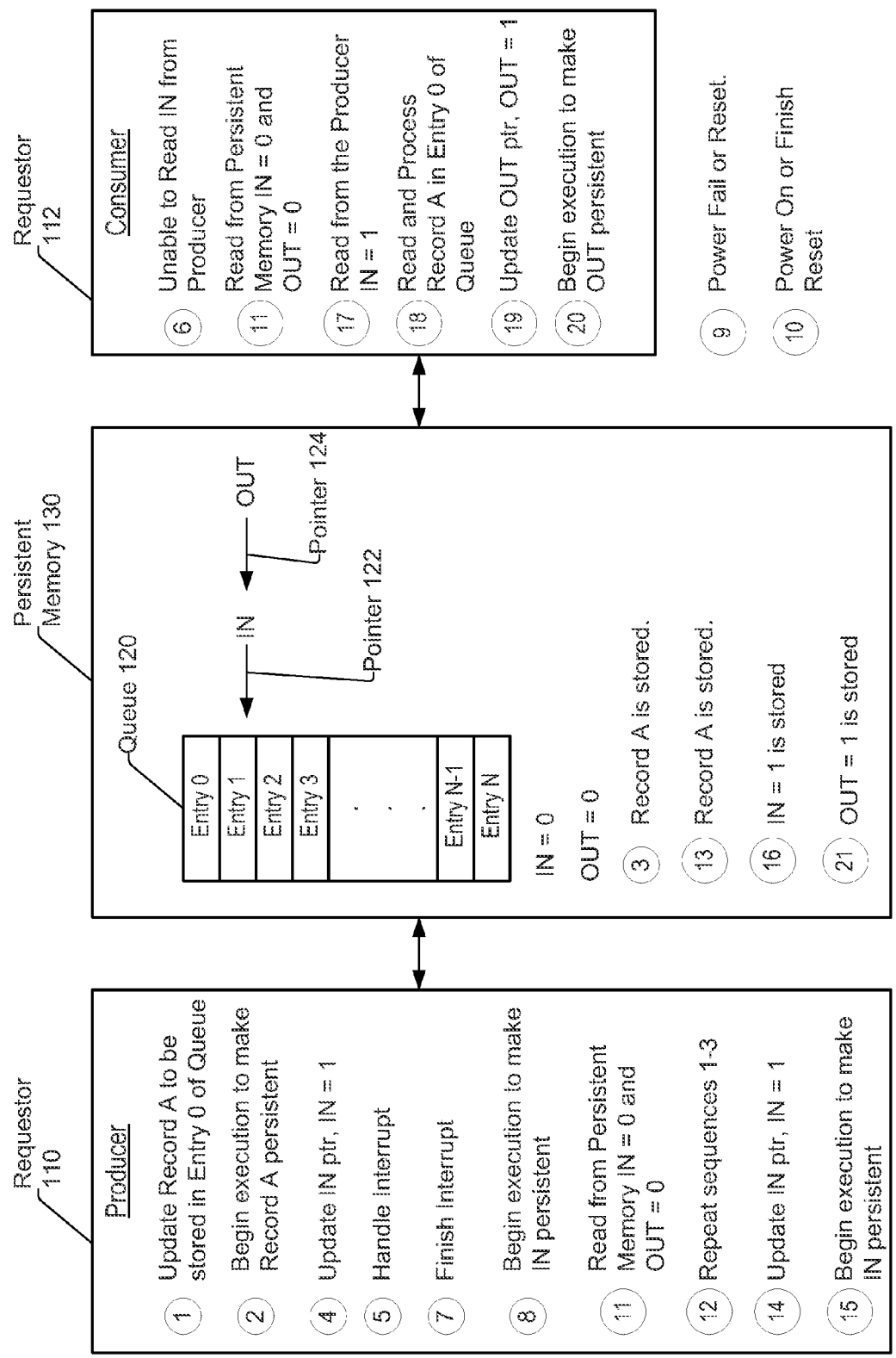
FIG. 4 is a generalized flow diagram illustrating yet another embodiment of accesses to persistent memory.

Turning now to FIG. 4, a generalized block diagram illustrating yet another embodiment of accesses to persistent memory is shown. The circuitry and logic described earlier is numbered identically. A series of sequences numbered 1 to 21 is shown. The numbered sequences 1 to 21 illustrate a condition when consistent data storage is maintained in the persistent memory despite unscheduled delays in storing data in the persistent memory. Similar to the sequences in FIG. 2, the sequences 1 to 21 in FIG. 3 are shown in sequential order. However, some sequences may occur in a different order than shown and some sequences may be performed concurrently.

Sequences 1 to 5 are the same as described earlier for FIG. 2. However, in sequence 1, produced data for Record A may have an associated coherence state transition to a state that indicates the cache line storing the produced data is both dirty and inaccessible for read accesses. An example of such a coherence state is the Persistent Dirty (PD) state. In some embodiments, the local copy of the Record A is stored in a given cache associated with the producer 110. A corresponding cache controller may prevent any read access of the local copy of Record A in the given cache responsive to detecting the local copy has not yet been stored in the persistent memory 130. Again, the cache controller may prevent a transition to a cache coherence state indicating the local copy is both dirty and is read accessible.

In sequence 2, the producer 110 may execute a store (write) instruction that sends modified data corresponding to Record A to persistent memory 130 as described earlier. In addition, a subsequent persistent memory barrier instruction may or may not be sent to the persistent memory 130 according to the instruction in a corresponding computer program. Additionally, the cache controller for a given cache for the producer 110 may invalidate any copy of the Record A in any cache level below the given cache as described earlier. Further, in response to detecting the local copy has not yet been received by the persistent memory 130 for storage, the cache controller may allow write access of the local copy of the Record A in the given cache only for a thread in the producer 110 that originated the store instruction for Record A.

Sequences 3-5 are the same as described earlier for FIG. 3. As described earlier, in some examples, prior to the generation of the interrupt, the producer 110 may have sent a store instruction for the IN pointer 122 to the persistent memory 130. However, a subsequent persistent memory barrier instruction may not have been sent yet. In other examples, the store instruction for the IN pointer 122 to the persistent memory 130 may not yet have been sent prior to the generation of the interrupt. In either case, the interrupt delays the process to make the local copy of the IN pointer 122 persistent. In other cases an interrupt may not occur, but there may still be a delay in the process to make the local updated copy of the IN pointer 122 persistent.

Additionally, if a store instruction for the IN pointer 122 is sent to the persistent memory 130, the cache controller for a given cache may invalidate any copy of the IN pointer 122 in any cache level below the given cache as described earlier. Additionally, a corresponding cache controller may prevent any read access of the local copy of the IN pointer 122 in the given cache responsive to detecting the local copy has not yet been stored in the persistent memory 130. The cache controller may prevent a transition to a cache coherence state indicating the local copy is both dirty and is read accessible. Rather, the cache controller may transition an associated coherence state to a state that indicates the cache line storing the IN pointer 122 is both dirty and inaccessible for read accesses. An example of such a coherence state is the Persistent Dirty (PD) state. Further, in response to detecting the local copy has not yet been sent to the persistent memory 130 for storage, the cache controller may allow write access of the local copy of the IN pointer 122 in the given cache only for a thread in the producer 110 that originated the store instruction to persistent memory 130.

In sequence 6, the consumer 112 is unable to load (read) an updated copy of the IN pointer 122 from the producer 110. The read request from the consumer 112 may be queued in the cache controller associated with the given cache for the producer 110. The read request may remain queued in the cache controller until the cache controller receives the acknowledgment that the local copy of the IN pointer 122 is stored in the persistent memory 130. In sequence 7, the producer 110 completes handling of the interrupt that occurred.

In sequence 8, the producer 110 begins execution to make the local updated copy of the IN pointer 122 persistent. In some examples, the producer 110 may execute a store (write) instruction that sends modified data corresponding to the IN pointer 122 to persistent memory 130 for storage. A cache controller, a memory controller, or both may include logic that determines from the address of the store instruction whether the modified data corresponding to the IN pointer 122 is to be stored in DRAM or the persistent memory 130. In addition, a subsequent persistent memory barrier instruction may be sent to the persistent memory 130. In other examples, the producer 110 may have already sent the store instruction to persistent memory 130, which was delayed in one or more queues by the interrupt handling. The producer 110 may now send the persistent memory barrier instruction to ensure the store instruction to persistent memory 130 is completed prior to completing any instructions after the store instruction.

In sequence 9, a power failure, reboot, or system reset occurs prior to the IN pointer is made persistent in the persistent memory 130. Data stored in volatile memory is lost. Data stored in non-volatile memory, such as the persistent memory 130, remains stored. In sequence 10, the power may be restored. Alternatively, the reboot or reset completes. Since read access for the updated local copy of the IN pointer 122 in the producer 110 was blocked earlier, the persistent memory 130 still stores consistent data.

In sequence 11, the consumer 112 reads values from the persistent memory 130 for each of the IN pointer 122 and the OUT pointer 124. The read values include the initial values for the IN pointer 122 and the OUT pointer 124. Similarly, the producer 110 reads the stored initial values from the persistent memory 130 for each of the IN pointer 122 and the OUT pointer 124.

Each of the producer 110 and the consumer 112 may re-execute instructions corresponding to a location in program code associated with the initial values for the IN pointer 122 and the OUT pointer 124. For example, in sequence 12, the producer 110 may re-execute code that includes updating and storing Record A in entry 0 of the queue 120 as performed earlier. Again, produced data for Record A may have an associated coherence state transition to a state that indicates the cache line storing the produced data is both dirty and inaccessible for read accesses until an acknowledgment is received that Record A is stored in the persistent memory 130. An example of such a coherence state is the Persistent Dirty (PD) state. In sequence 13, the Record A may be stored in the persistent memory 130. An acknowledgment of the completed persistent store operation may be sent to the producer 110. Alternatively, an acknowledgment may be sent to a cache controller or a memory controller associated with the producer 110. In sequence 14, the producer 110 may again update a local copy of the IN pointer 122 as performed earlier. For example, the local copy of the IN pointer 122 may have a value of 0 and it is incremented to a value of 1.

In sequence 15, the producer 110 begins execution to make the local updated copy of the IN pointer 122 persistent. For example, the producer 110 may execute a persistent store instruction to persistent memory. Modified data for the IN pointer 122 may have an associated coherence state transition to a state that indicates the cache line storing the modified data is both dirty and inaccessible for read accesses. An example of such a coherence state is the Persistent Dirty (PD) state.

In sequence 16, the updated copy of the IN pointer 122 may be stored in the persistent memory 130. An acknowledgment of the completed persistent storage may be sent to the producer 110. Alternatively, an acknowledgment may be sent to a cache controller or a memory controller associated with the producer 110. The received acknowledgment may cause the cache controller to again allow read and write access of the local copy of the IN pointer 122 in the given cache associated with the producer 110. For example, the cache controller may transition a corresponding cache coherence state for the cache line holding the local copy of the IN pointer 122 to an Exclusive (E) clean state.

In sequence 17, the consumer 112 reads the local copy of the IN pointer 122 from the producer 110. Now, the consumer 112 has a local copy of the IN pointer 122 with a value of 1, which is the same value of the IN pointer stored in the persistent memory 130. In sequence 18, the consumer 112 reads and processes a copy of the Record A. In sequence 19, the consumer 112 may update a local copy of the OUT pointer 124. For example, the local copy of the OUT pointer 124 may have a value of 0 and it is incremented to a value of 1.

In sequence 20, the consumer begins execution to make the updated local copy of the OUT pointer 124 persistent. For example, the consumer 112 may execute a persistent store instruction to persistent memory 130. In some embodiments, the local copy of the OUT pointer 124 is stored in a given cache associated with the consumer 112. A corresponding cache controller may prevent any read access of the local copy in the given cache responsive to detecting an acknowledgment that the local copy is stored in the persistent memory 130 is not yet received. The cache controller may prevent a transition to a cache coherence state indicating the local copy is both dirty and is read accessible.

Additionally, the cache controller may invalidate any copy of the OUT pointer 124 in any cache level below the given cache as described earlier. Further, in response to detecting the local copy has not yet been sent to the persistent memory 130 for storage, the cache controller may allow write access of the local copy of the OUT pointer 124 in the given cache only for a thread in the consumer 124 that originated the instruction to persistent memory.

In sequence 21, the updated copy of the OUT pointer 124 may be stored in the persistent memory 130. An acknowledgment of the completed persistent storage may be sent to the consumer 112. Alternatively, an acknowledgment may be sent to a cache controller or a memory controller associated with the consumer 112. The received acknowledgment may cause the cache controller to again allow read and write access of the local copy of the OUT pointer 124 in the given cache associated with the consumer 112. For example, the cache controller may transition a corresponding cache coherence state for the cache line holding the local copy of the OUT pointer 124 to an Exclusive (E) state.

Figure 5:
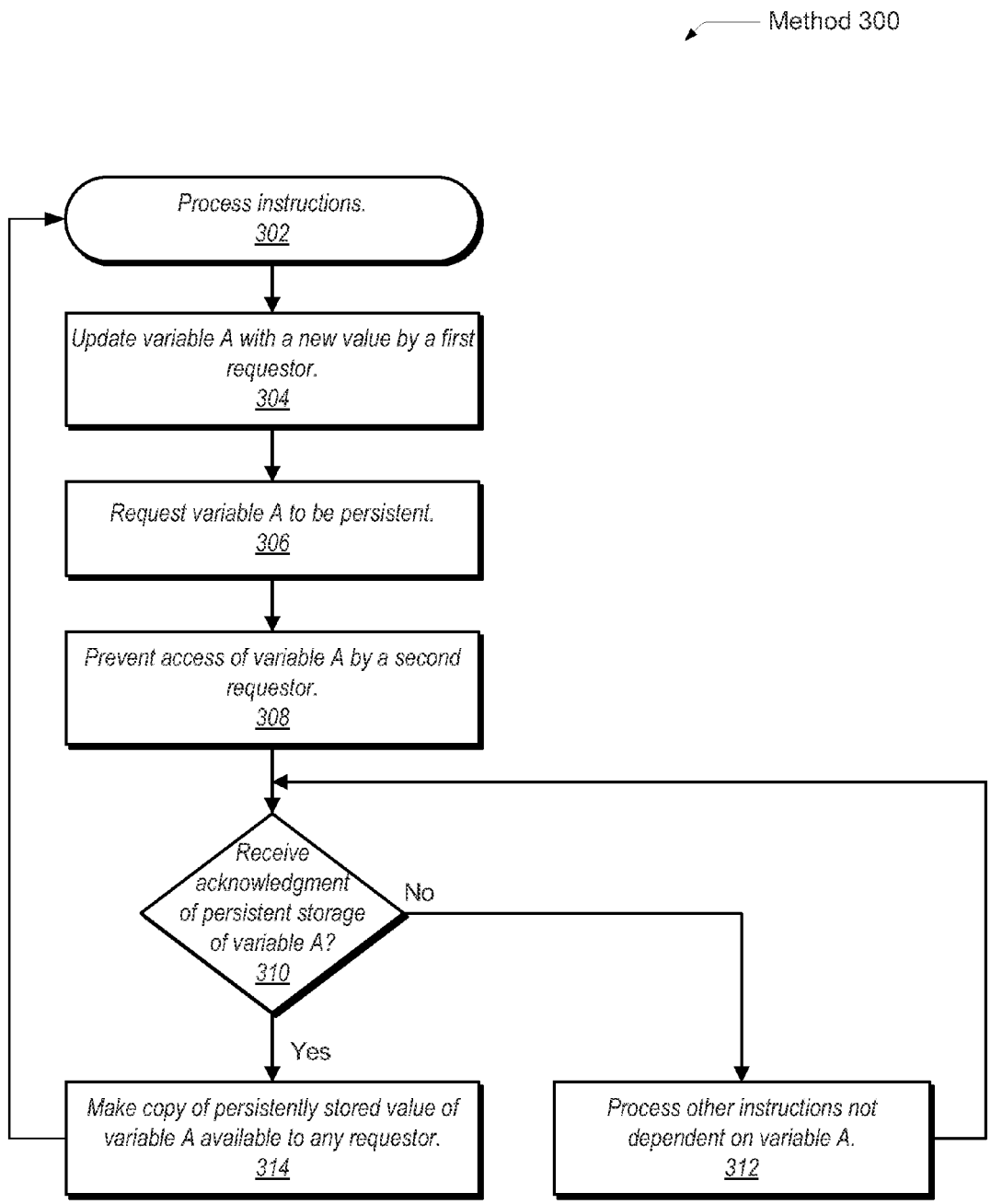
FIG. 5 is a generalized flow diagram illustrating one embodiment of a method for reliably utilizing persistent data.

Referring now to FIG. 5, a generalized flow diagram of one embodiment of a method 300 for reliably utilizing persistent data is illustrated. For purposes of discussion, the steps in this embodiment are shown in sequential order. However, some steps may occur in a different order than shown, some steps may be performed concurrently, some steps may be combined with other steps, and some steps may be absent in another embodiment.

In block 302, program instructions are processed. The program instructions may correspond to one or more software applications. During processing, a given processor within the system may access data located in on-die caches and off-die memory in the system. In general, program instructions may be fetched, decoded, executed and committed. One or more processors may be used in a computing system to process the program instructions. Each processor may execute multiple threads. Each thread among the one or more processors may be a requestor that generates read and write access requests for persistent data.

In block 304, a first requestor updates a local copy of variable A. The updated local copy of variable A may be stored in a cache line in a given cache associated with the first requestor. In block 306, the first requestor may request to make variable A persistent. For example, the first requestor may execute a store (write) instruction that sends modified data corresponding to variable A to persistent memory. A cache controller, a memory controller, or both may include logic that determines a respective address space of two address spaces for each of DRAM and the persistent memory. Therefore, it is known which memory, the DRAM or the persistent memory, is targeted by a given store instruction.

In block 308, access of the variable A may be blocked for a second requestor. The local copy of the variable A is stored in a given cache associated with the first requestor. A corresponding cache controller may prevent any read access of the local copy of variable A in the given cache responsive to detecting the local copy has not yet been stored in the persistent memory. For example, an acknowledgment from the persistent memory may not yet have been received. The cache controller may prevent a transition to a cache coherence state indicating the local copy is both dirty and is read accessible. Rather, the cache controller may transition the cache coherence state for the local copy of variable A to a state that indicates the cache line storing the modified data is both dirty and inaccessible for read accesses. An example of such a coherence state is the Persistent Dirty (PD) state. The cache controller may allow write access of the variable A in the given cache only for a thread that originally modified the variable A.

If the first requestor has not yet received acknowledgment of persistent storage of variable A (conditional block 310), then in block 312, other instructions not dependent on variable A are processed. Both the first requestor and other requestors process respective independent instructions although a commit pipeline stage may be stalled to maintain in-order retirement.

The local copy of variable A in the given cache may still have an associated coherence state that indicates variable A is dirty, but does not have read access. The coherence state, however, may allow write access to variable A in the given cache only for the first requestor that originated the store instruction to persistent memory. For example, a given thread of multiple threads executing in a first processor of one or more processors may have originated the store instruction to persistent memory for variable A. Therefore, the given thread has write access to variable A, but no other thread or processor has write access. Allowing write access to variable A in the given cache for the given thread may reduce a total number of write accesses to the persistent memory for the cache line holding variable A. For example, the cache line may store 64 bytes. The original store instruction to persistent memory and following store instructions to persistent memory from the given thread may modify a byte, 4 bytes, 8 bytes, or some other amount smaller than the total 64 bytes. The original store instruction and following store instructions to persistent memory from the given thread may modify non-overlapping data within the 64-byte cache line.

If the first requestor has received acknowledgment of persistent storage of variable A (conditional block 310), or acknowledgment of persistent storage of the cache line holding variable A, then in block 314, the local copy of variable A in the given cache, which now matches the persistently stored value of variable A is once again made available to any requestor. For example, the coherence state associated with variable A may be transitioned to an Exclusive (E) coherence state.

Figure 6:
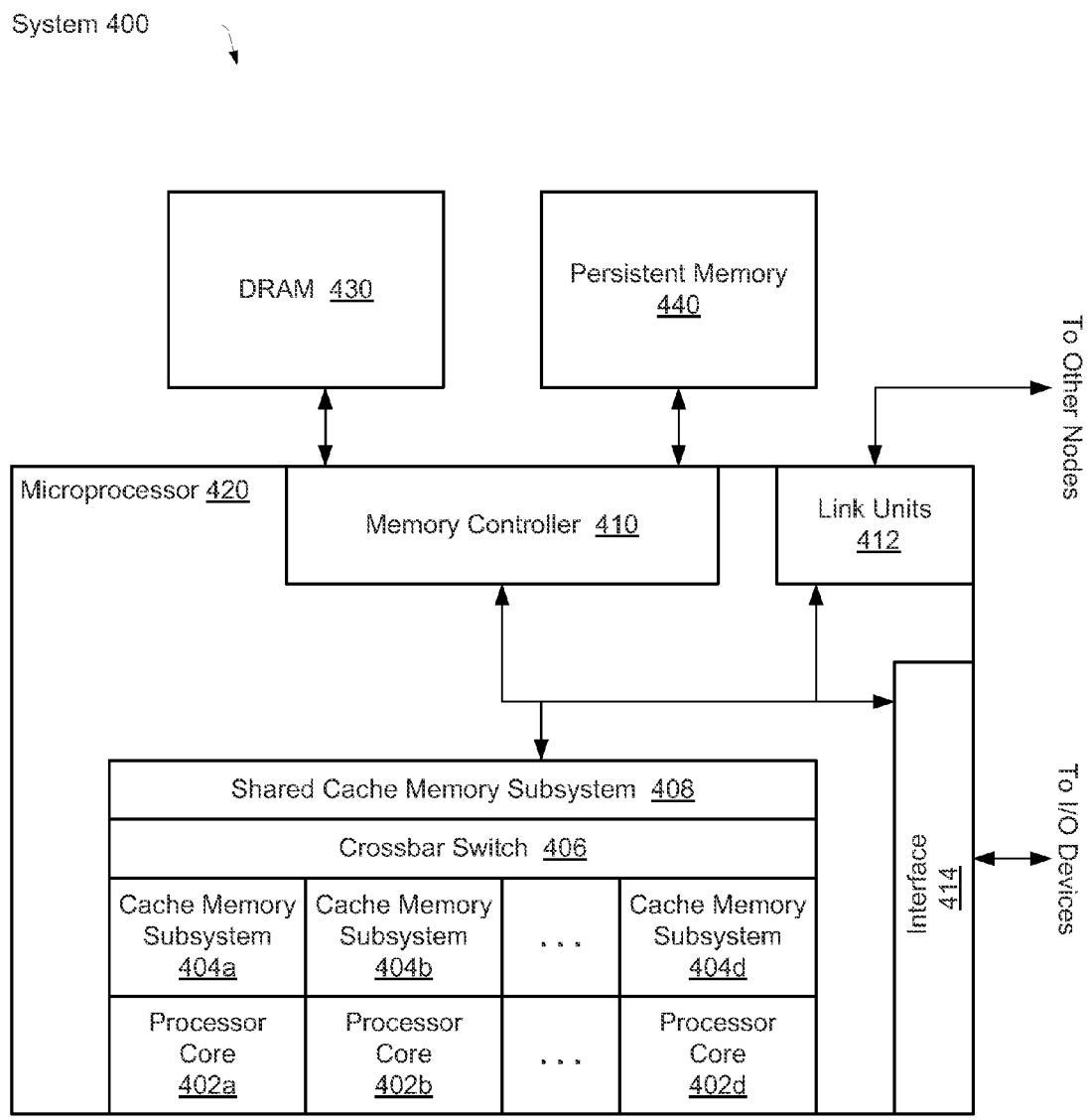
FIG. 6 is a generalized block diagram illustrating one embodiment of an exemplary node.

Referring now to FIG. 6, a generalized block diagram of one embodiment of an exemplary node 400 is shown. As shown in the illustrated embodiment, the node 400 includes at least processor cores 402a-402d and persistent memory 440. The node 400 may execute multiple threads on the processor cores 402a-402d, wherein the threads may execute store instructions to persistent memory in order to store data in the persistent memory 440. The microprocessor 400 may also include memory controller 410, interface logic 414, and one or more cache memory subsystems 404a-404d corresponding to the processor cores 402a-402d. In addition, the node 400 may include a crossbar switch 406 and a shared cache memory subsystem 408. In various embodiments, the illustrated functionality of processing node 400 is incorporated upon a single integrated circuit.

In various embodiments, each of the processor cores 402a-402d includes circuitry for executing instructions according to a given general-purpose instruction set. For example, the SPARC® instruction set architecture (ISA) may be selected. Alternatively, the x86®, x86-64®, Alpha®, PowerPC®, MIPS®, PA-RISC®, or any other instruction set architecture may be selected. Each of the processor cores 402a-402d may include a superscalar microarchitecture with one or more multi-stage pipelines. Also, each of the processor cores 402a-

402d may be designed to execute multiple threads. A multi-thread software application may have each of its software threads processed on a separate pipeline within a core, or alternatively, a pipeline may process multiple threads via control at certain function units.

Generally, each of the processor cores 402a-402d accesses an on-die level-one (L1) cache within a cache memory subsystem for data and instructions. There may be multiple on-die levels (L2, L3 and so forth) of caches. In some embodiments, the processor cores 402a-402d share a cache memory subsystem 408. If a requested block is not found in the caches, then a read request for the missing block may be generated and transmitted to the memory controller 410. Interfaces between the different levels of caches may comprise any suitable technology.

Using the interface logic 414, the node 400 may communicate with input/output (I/O) devices. The I/O devices may include various computer peripheral devices. Alternatively, the node 400 may communicate with an I/O bridge, which is coupled to an I/O bus. Additionally, the interface logic 414 may generate control and response packets in response to transactions sourced from processor cores and cache memory subsystems located both within the processing node 400 and in other nodes. The interface logic 414 may include logic to receive packets and synchronize the packets to an internal clock. The interface logic 414 may include one or more coherence units. Alternatively, the coherence units may be located in the memory controller 410. The coherence units may perform cache coherency actions for packets accessing memory according to a given protocol. The coherence units may include a directory for a directory-based coherency protocol.

In various embodiments, the node 400 may include link units 412 connected to coherence links. In various embodiments, the interface logic 414 is located outside of the memory controller 410 as shown. In other embodiments, particular components of the logic and functionality within the interface logic 414 may be incorporated in the memory controller 410.

The memory controller 410 may include control circuitry for interfacing to memories. Additionally, the memory controllers may include request queues for queuing memory requests. In one embodiment, the coherency point for addresses is the memory controller 410 within the node 400 connected to the off-die memory storing bytes corresponding to the addresses. In other embodiments, the cache coherency scheme may be directory based, and the coherency point is the respective directory within the node 400. In a directory-based cache coherence scheme, the coherence units may store a respective directory.

The off-die memory may include dynamic random access memory (DRAM) 430, a Buffer on Board (BoB) interface chip between the node 400 and DRAM 430, persistent memory 440, and so forth. The off-die memory may be connected to the memory controller 410. In the illustrated embodiment, the node 400 is connected to DRAM 430 and persistent memory 440.

The memory controller 410 may include logic that determines a respective address space for each of the DRAM 430 and the persistent memory 440. The address spaces may be programmed and loaded upon a startup sequence. The DRAM 430 may include one or more dual in-line memory module (DIMM) slots. The DRAM may be further connected to lower levels of a memory hierarchy, such as a disk memory and offline archive memory. The persistent memory may include non-volatile data storage media. Examples of non-volatile data storage media may include phase change memory (PCM), spin torque transfer RAM, and memristors.

In some embodiments, the cache memory subsystems 404a-404d include a L1 cache and a L2 cache. Additionally, the shared cache memory subsystem 408 includes a L3 cache. The L2 cache may be selected as a given cache level to handle accesses to persistent data prior to the data is actually stored in the persistent memory 440. The L2 cache controller may perform particular steps to ensure consistent data is stored in the persistent memory 440. For example, the L2 cache controller may perform particular steps described earlier corresponding to the sequences described earlier in FIG. 2 and FIG. 4. Next, further details of these steps are provided.

Figure 7:
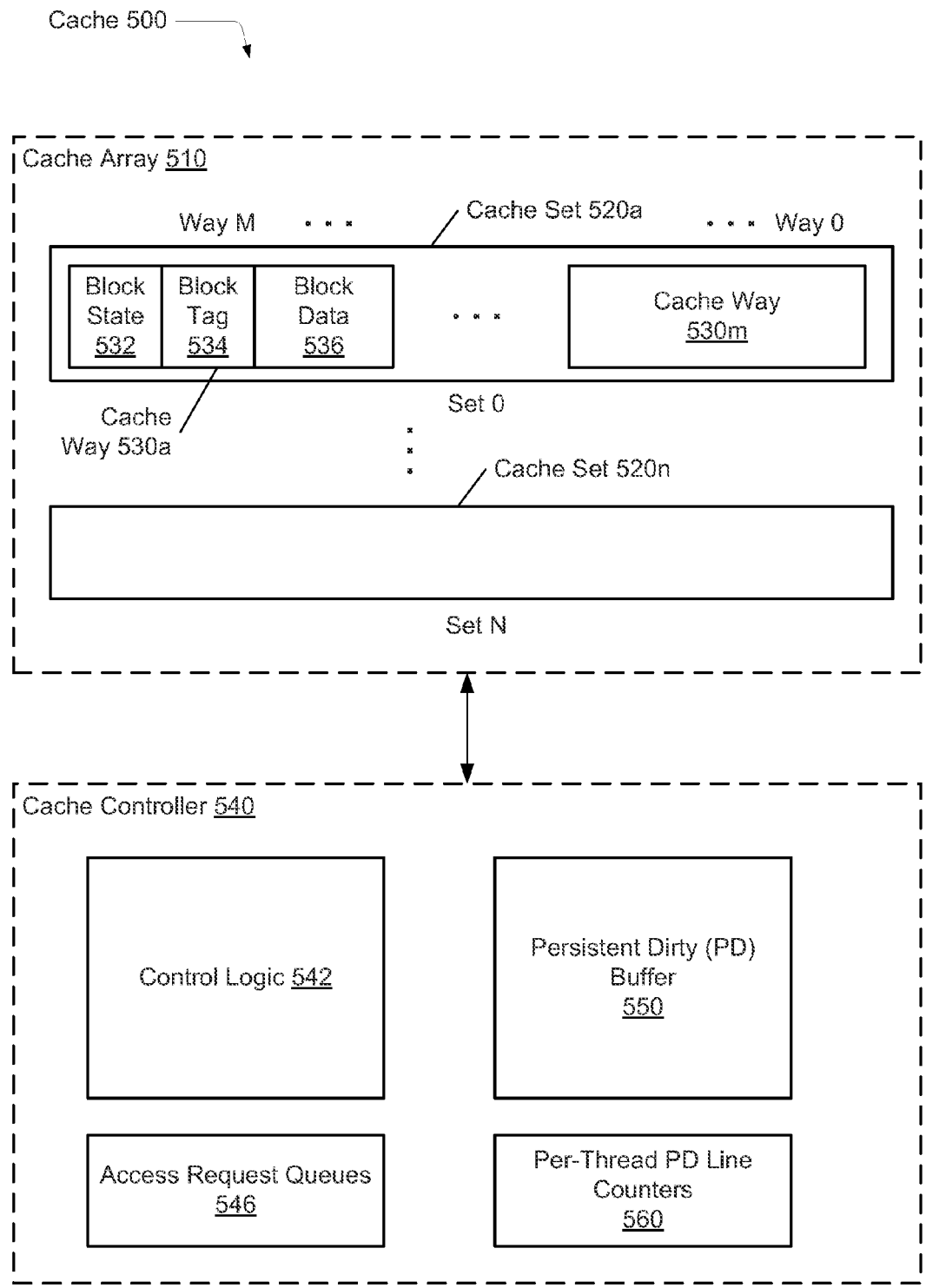
FIG. 7 is a generalized block diagram of one embodiment of an exemplary cache.

Turning now to FIG. 7, a generalized block diagram of one embodiment of an exemplary cache 500 is shown. As shown in the illustrated embodiment, the cache 500 includes a cache array 510 and a cache controller 540. Generally, the cache array 510 may store one or more blocks, each of which is a copy of data stored at a corresponding address in the system memory. As used herein, a "block" is a set of bytes stored in contiguous memory locations, which are treated as a unit for coherency purposes. As used herein, the terms "cache block", "block", "cache line", and "line" are interchangeable. In some embodiments, a block may also be the unit of allocation and deallocation in a cache. The number of bytes in a block may be varied according to design choice, and may be of any size. As an example, 32 byte and 64 byte blocks are often used.

The cache array 510 may store data in various manners. For example, data may be stored in the cache array 510 using a set-associative cache organization. An M-way set associativity is shown in the illustrated embodiment, wherein M is an integer. Each one of the cache sets 520a-520n includes cache ways 530a-530m. A different number of ways, such as 4-way, 8-way, 16-way, or other, within the set-associative cache array 510 may be chosen. In various embodiments, each one of the cache sets 520a-520n utilizes the chosen storage manner, such as set associativity.

Each one of the cache ways 530a-530m may include a block state 532, a block tag 534, and block data 536. Although block state 532 and block tag 534 may be stored in contiguous bits with block data 536 within each one of the cache ways 530a-530m, in other embodiments, the block state 532 and the block tag 534 may be stored in a separate array, rather than in a same array as block data 536. The block state 532 may comprise at least one or more of the following: a valid bit, a cache block owner encoding that indicates the source which owns the corresponding cache block, Least Recently Used (LRU) eviction information used in association with a cache replacement algorithm employed by the cache controller 540, an indication that designates a cache coherency state, and so forth. Other included state information is possible and contemplated.

The block state 532 may support storing an indication of a first set of cache coherency states for data to be stored in volatile memory, such as a DRAM. The first set of supported cache coherency states may include Modified (M), Owned (O), Exclusive (E), Shared (S), Invalid (I), or other. The block state 532 may support storing an indication of a second set of cache coherency states for data to be stored in non-volatile memory, such as persistent memory. The second set of supported cache coherency states for data to be stored in persistent memory may include Modified (M) with write only access, Exclusive (E), Shared (S), and Invalid (I). The Modified state may also be referred to as a Persistent Dirty (PD) state. The PD state may only allow write access for a thread that originally sent a store instruction for persistent memory to the cache 500 for the corresponding data. Control logic 542 in the cache controller 540 may set and transition coherence states to store in the block state 532 and manage access to the block data 536.

A block index portion of an address used to access the cache 500 may be used to determine which of the cache blocks are being accessed within a chosen one of the cache sets 520*a*-520*n*. In addition, an offset in the address of the access request may be used to indicate a specific byte or word within a cache block. A given one of the cache sets 520*a*-520*n* may be selected from other sets by a block index portion of an address used to access the cache 500. A cache block hit may occur when a portion of the block state 532, such as at least a valid field, and a block tag 534 match values from an access request.

The cache controller 540 may include control logic 542, access request queues 546, a PD buffer 550 and per-thread PD line counters 560. Memory access requests may be stored in the access request queues 546. Generally, the control logic 542 may determine a manner used to order accesses of the cache array 510 and perform updates to state, address and data stored in the cache array 510. In various embodiments, a given thread executed on an associated processor may execute a persistent store instruction to persistent memory for a given data block. The store instruction may be sent from the processor to the cache 500. In some embodiments, the cache 500 is selected as a cache at a given level for handling accesses to data scheduled to be stored as persistent memory. For example, the cache 500 may be an L2 cache for the processor. A L3 cache may be a last level of cache before the memory controller.

The store instruction to persistent memory may be stored in the access request queues 546. When the control logic 542 determines to process the store instruction to persistent memory, a selected cache way is updated with the store data corresponding to the store instruction to persistent memory and a PD coherence state. The PD state may indicate the store data is dirty, but not read accessible. The control logic 542 may prevent read access of the selected cache way until an acknowledgment is received indicating the store data is written into the persistent memory. Additionally, the control logic 542 may send control signals to the L1 cache to invalidate a copy in the L1 cache of the cache way corresponding to the store instruction to persistent memory. Further, control logic within the processor may prevent any bypass forwarding of data corresponding to the store instruction to persistent memory within the load-store unit (LSU).

Until an indication is received indicating the store data is sent to the persistent memory to be written into the persistent memory, the control logic 542 may allow write access of the selected cache way in the cache array 510 only for the given thread that executed the store instruction to persistent memory. The control logic 542 may update the block status of the selected cache way with an identifier of the given thread (given thread ID). Each of the threads may execute a synchronization instruction, such as a persistent memory barrier instruction, that forces all previous store instructions to persistent memory to commit data to the persistent memory and perform an acknowledgment of the commit prior to executing any instructions after the synchronization instruction. Identifying the thread ID in the block state in the cache array 510 with the store data may allow the given thread to continue processing past the synchronization instruction once all cache lines for the given thread with a PD state have committed to the persistent memory. The given thread would not have to wait for cache lines with a PD state corresponding to other threads to have data committed to persistent memory.

The cache controller 540 also may allocate an entry in the PD buffer 550 for the store instruction to persistent memory. The allocated entry may store portions of an address used for the store instruction to persistent memory, such as an index. An indication of the selected way, such as the block tag or an identifier of the selected way, may also be stored in the allocated entry. A thread ID and a processor ID may also be stored in the allocated entry. In various embodiments, the PD buffer 550 may be implemented as a first-in-first-out (FIFO). In other embodiments, another type of data structure may be used. The per-thread PD counters 560 maintain a count of cache lines with a PD state for a given thread that have yet to commit to persistent memory. A corresponding counter is incremented in the counters 560 for the store instruction to persistent memory that caused a coherence state transition to the PD state from the given thread. For example, a first store instruction to persistent memory may update a first byte within a given cache line. The first store instruction to persistent memory may cause a corresponding counter in the counters 560 to increment. A second store instruction to persistent memory may update a second byte within the given cache line before the modified first byte is written to persistent memory. However, the given cache line already has a corresponding coherence state equal to the PD state. Therefore, the second store instruction to persistent memory may not cause the corresponding counter in the counters 560 to increment. The counters 560 may maintain a count of cache lines to send to persistent memory, which may generally be a fewer number of transactions than the number of store instructions to the cache lines.

The control logic 542 may determine when to deallocate an entry from the PD buffer 550. Deallocation from the PD buffer 550 may cause a request to be sent to a higher-level cache to commit the store data to persistent memory. For example, the cache 500 may be a L2 cache and the cache controller 540 deallocates an entry from the PD buffer 550 and sends a corresponding request to a L3 cache. The L3 cache may lock a corresponding cache line to prevent any further consumption or modification of the cache line associated with the store instruction to persistent memory. Alternatively, the cache 500 may be directly connected to a memory controller, which is connected to the persistent memory.

The control logic 542 may utilize many algorithms to determine when to deallocate entries from the PD buffer 550. For example, the control logic 542 may use particular criteria for the determination, wherein the criteria may include a timer or count value since a transition to the PD coherence state, a filled capacity threshold for the entire buffer, a filled capacity threshold on a thread basis, a priority value associated with the store instruction to persistent memory, execution of a synchronization instruction, such as the member persist instruction; and so forth. A number of entries to allocate and deallocate simultaneously may be configurable and may be based on buses to other components. When an entry in the PD buffer 550 is selected for deallocation, a corresponding counter in the per-thread PD line counters 560 is decremented. When the cache controller 540 receives an acknowledgment that the cache line has been committed to persistent memory, the control logic 542 may transition the coherence state for the selected cache way in the cache array 510 from PD to Invalid (I).

Regarding executing a synchronization instruction, the synchronization instruction for a given thread may not commit until all prior store instructions to persistent memory for the given thread have corresponding data stored in persistent memory. The processor executing the given thread may indicate that on-die store queue and/or store buffer has no store instructions to persistent memory allocated. Similarly, the selected cache, such as a L2 cache, may indicate no storage of cache lines for the given thread with a PD coherence state.

Alternatively, the synchronization instruction for the given thread may retire in the processor and an indication is sent to the cache 500. If the control logic 542 detects a counter in the per-thread PD line counters 560 stores a zero or other value indicating no cache lines with a PD state are stored in the cache array 510 for the given thread, then the control logic 542 may determine the synchronization instruction has completed. If the counter stores a non-zero value or other value that indicates caches lines with a PD state are stored in the cache array 510 for the given thread, then the synchronization instruction may be stored. For example, the synchronization instruction may be stored in the access request queues 546. The synchronization instruction completes when prior store instructions (in program order) to persistent memory commit to persistent memory. Later store instructions to persistent memory are not allowed to commit to persistent memory until the synchronization instruction completes.

Figure 8:
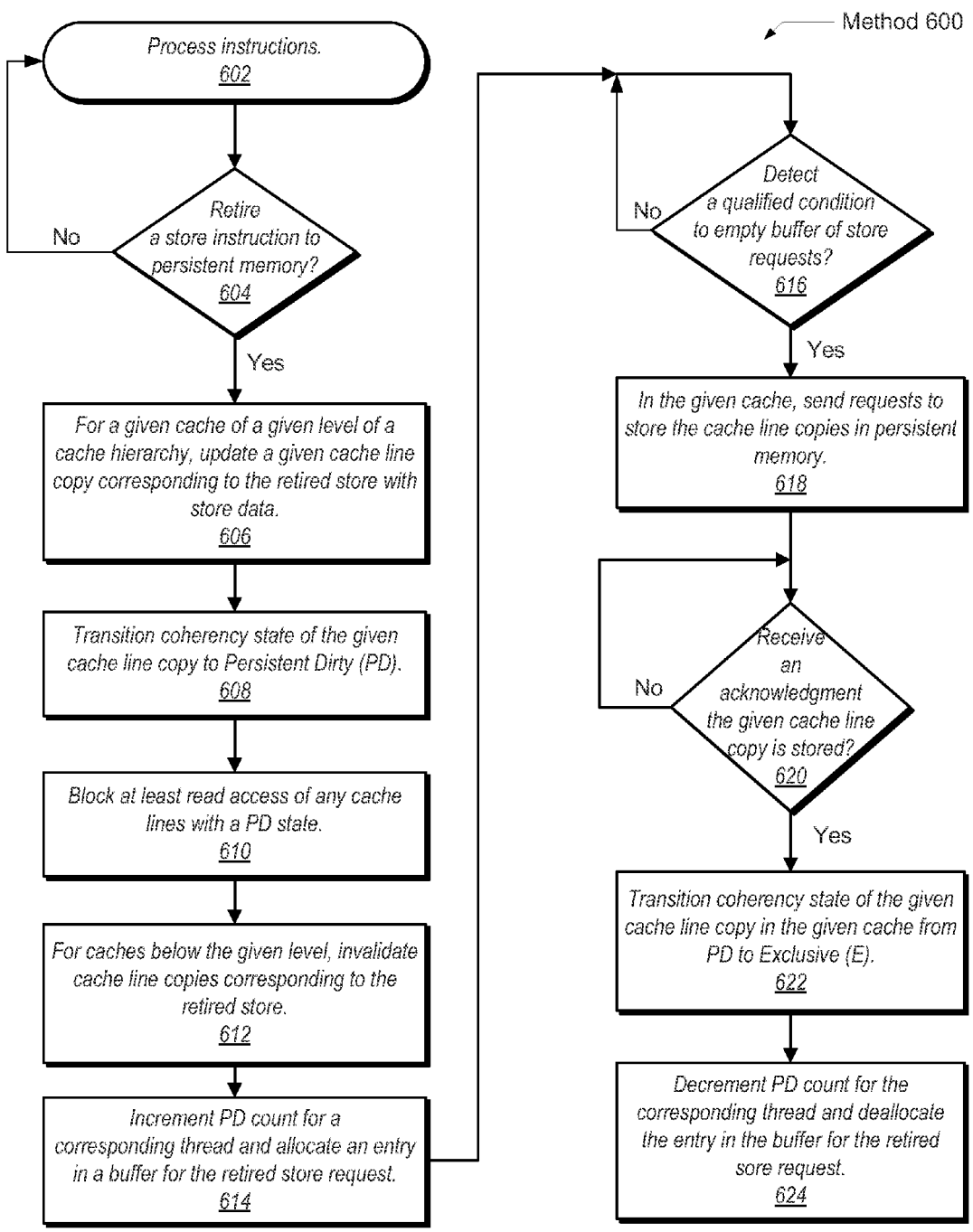
FIG. 8 is a generalized flow diagram illustrating one embodiment of a method for reliably processing persistent store instructions.

Referring now to FIG. 8, a generalized flow diagram of one embodiment of a method 600 for reliably processing persistent store instructions is illustrated. For purposes of discussion, the steps in this embodiment are shown in sequential order. However, some steps may occur in a different order than shown, some steps may be performed concurrently, some steps may be combined with other steps, and some steps may be absent in another embodiment.

In block 602, program instructions are processed for one or more software applications. If a given processor retires a store instruction to persistent memory (conditional block 604), then in block 606, a copy of a given cache line corresponding to the retired store is updated with the store data. The given cache line may be in a given cache at a given level of a cache hierarchy. In block 608, a cache coherency state of the given cache line may transition to a persistent dirty (PD) coherence state. The PD state may indicate the cache line is dirty and is not read accessible.

In block 610, a cache controller in the given cache may block read access of any cache lines with a PD state. In block 612, for caches below the given level, any cache line copies corresponding to the retired store may be invalidated. The caches below the given level may be located between a corresponding processor and the given level. For example, the L1 cache is below the L2 cache. In block 614, a count of a number of cache lines with a PD coherence state for the corresponding thread is incremented. Additionally, an entry for the retired store request is allocated in a buffer. The buffer may store corresponding information for store instructions to persistent memory that have been sent to the given cache, but have not yet been committed to the persistent memory. The buffer may be used to send requests later to the persistent memory for storage. Although further store instructions to persistent memory may update the cache line with a PD state before the cache line is written to persistent memory, the count of the number of cache lines with a PD coherence state for the corresponding thread may not be incremented since the subsequent store instructions to persistent memory did not cause a coherence state transition to the PD state. The cache line already had an associated PD coherence state.

One of many qualifying conditions may be used to determine when and how many requests to send to the persistent memory for storage of data associated with buffered store instructions. As described earlier, control logic may use particular criteria for the determination, wherein the criteria may include a timer or count value since a transition to the PD coherence state, a filled capacity threshold for the entire buffer, a filled capacity threshold on a thread basis, a priority value associated with the store instruction, execution of a synchronization instruction, such as the member persist instruction; and so forth.

If a qualified condition to empty the buffer of store requests to persistent memory is detected (conditional block 616), then in block 618, requests are sent to store the cache line copies in persistent memory that are currently stored in the given cache. If an acknowledgment is received indicating the given cache line copy is stored in persistent memory (conditional block 620), then in block 622, a coherency state of the given cache line copy in the given cache is transitioned from PD to Exclusive (E). The given cache line is made read accessible again. In block 624, the PD count for the corresponding thread is decremented. Additionally, the entry in the buffer for the retired store request is deallocated.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
a plurality of processors;
a cache configured to be accessed by at least two of the plurality of processors;
a cache controller coupled to the cache;
a persistent memory coupled to the cache controller;
wherein a first thread of a plurality of threads executed by a first processor of the plurality of processors is configured to send a given data block to the persistent memory for storage via the cache controller; and
wherein the cache controller is configured to:
in response to receiving the given data block and determining a coherence state corresponding to the given data block does not already prevent read access, increment a respective per-thread count for the first thread;
prevent any read access of a copy of the given data block in said cache, in response to detecting the given data block is to be sent to be stored in the persistent memory; and
in response to receiving a corresponding acknowledgment that the given data block is stored in the persistent memory, decrement the respective per-thread count for the first thread.

2. The computing system as recited in claim 1, wherein the cache controller is further configured to allow read and write access of said copy of the given data block in said cache, in response to receiving an acknowledgment that the given data block is stored in the persistent memory.

3. The computing system as recited in claim 2, wherein in response to determining the given data block is to be stored in the persistent memory, the cache controller is further configured to invalidate any copy of the given data block in any cache levels between the first processor and said cache.

4. The computing system as recited in claim 2, wherein in response to detecting the data is to be stored in the persistent memory, the cache controller is further configured to allow write access of said copy of the given data block in said cache only for the first thread of a plurality of threads executed by the first processor.

5. The computing system as recited in claim 4, wherein in response to executing a given instruction in the first thread, the first processor is configured to:
select the given data block to send to the persistent memory for storage with a corresponding acknowledgment; and
send both an indication and the given data block to the cache controller, wherein the indication indicates storing the given data block in the persistent memory with acknowledgment.

6. The computing system as recited in claim 5, wherein the given instruction is a persistent store instruction and the persistent memory utilizes a storage medium comprising one of phase change memory (PCM), spin torque transfer RAM, and memristors.

7. The computing system as recited in claim 5, wherein the first processor is further configured to prevent bypassing of a data block corresponding to a persistent store instruction to a load instruction dependent upon the persistent store instruction.

8. The computing system as recited in claim 5, wherein in response to detecting a respective data block is to be stored in the persistent memory, the cache controller is further configured to prevent any coherence state transition to a coherence state indicating the respective data block is both dirty and is read accessible.

9. The computing system as recited in claim 5, wherein the cache controller is further configured to send an indication to the first processor indicating to commit a synchronization instruction executed by the first thread in response to determining a respective acknowledgment has been received for each data block corresponding to the first thread to be sent to the persistent memory for storage.

10. The computing system as recited in claim 5, wherein the cache controller is further configured to:
receive from the first processor a first indication a synchronization instruction executed by the first thread is committed; and
store a second indication indicating the synchronization instruction is not yet completed responsive to determining at least one respective acknowledgment has not been received for a data block corresponding to the first thread to be sent to the persistent memory for storage.

11. The computing system as recited in claim 10, wherein the cache controller is further configured to store a third indication indicating the synchronization instruction is completed responsive to determining a respective acknowledgment has been received for each data block corresponding to the first thread to be sent to the persistent memory for storage.

12. The computing system as recited in claim 10, wherein the cache controller is further configured to prevent any data block from the first thread in the first processor received after the first indication to be sent to the persistent memory for storage responsive to determining at least one respective acknowledgment has not been received for a data block received prior to the first indication.

13. A method to be used in a computing system, the method comprising:
accessing a cache by at least two processors of a plurality of processors;
in response to receiving a given data block from a first thread of a plurality of threads executed by a first processor of the plurality of processors is to be sent to a persistent memory and determining a coherence state corresponding to the given data block does not already prevent read access, incrementing a respective per-thread count for the first thread;
sending the given data block to a persistent memory for storage;
preventing any read access of a copy of the given data block in the cache, in response to detecting the given data block is to be sent to be stored in the persistent memory; and
in response to receiving a corresponding acknowledgment that the given data block is stored in the persistent memory, decrement the respective per-thread count for the first thread.

14. The method as recited in claim 13, further comprising allowing read and write access of said copy of the given data block in said cache, in response to receiving an acknowledgment that the given data block is stored in the persistent memory.

15. The method as recited in claim 14, wherein the persistent memory utilizes a storage medium comprising one of phase change memory (PCM), spin torque transfer RAM, and memristors.

16. The method as recited in claim 14, further comprising preventing any coherence state transition to a coherence state indicating a respective data block is both dirty and is read accessible.

17. A non-transitory computer readable storage medium storing program instructions operable to reduce power consumption during data transport across multiple nodes, wherein the program instructions are executable by a processor to:
access a cache by at least two processors of a plurality of processors;
in response to receiving a given data block from a first thread of a plurality of threads executed by a first processor of the plurality of processors is to be sent to a persistent memory and determining a coherence state corresponding to the given data block does not already prevent read access, increment a respective per-thread count for the first thread;
send a given data block to a persistent memory for storage;
prevent any read access of a copy of the given data block in the cache, in response to detecting the given data block is to be sent to be stored in the persistent memory; and
in response to receiving a corresponding acknowledgment that the given data block is stored in the persistent memory, decrement the respective per-thread count for the first thread.

18. The non-transitory computer readable storage medium as recited in claim 17, wherein the program instructions are further executable to allow read and write access of said copy of the given data block in said cache, in response to receiving the acknowledgment the given data block is stored in the persistent memory.

19. The non-transitory computer readable storage medium as recited in claim 17, wherein the program instructions are further executable to prevent any coherence state transition to a coherence state indicating a respective data block is both dirty and is read accessible.

* * * * *